United States Patent
Nohara et al.

(10) Patent No.: US 6,558,592 B1
(45) Date of Patent: May 6, 2003

(54) SYNTHETIC RESIN INTERNAL FOAM MOLDING MACHINE AND METHOD

(75) Inventors: Iwao Nohara, Nakatsugawa (JP); Tomio Nakajima, Nakatsugawa (JP); Kiyotaka Ida, Nakatsugawa (JP); Masahiko Sameshima, Settsu (JP); Yoshiyuki Kobayashi, Nara (JP); Kenji Yamaguchi, Osaka (JP)

(73) Assignees: Daisen Industry Co., Ltd., Nakatsugawa (JP); Kaneka Corporation, Osaka (JP)

( * ) Notice: Subject to any disclaimer, the term of this patent is extended or adjusted under 35 U.S.C. 154(b) by 0 days.

(21) Appl. No.: 09/647,293

(22) PCT Filed: Mar. 31, 1999

(86) PCT No.: PCT/JP99/01709
§ 371 (c)(1),
(2), (4) Date: Nov. 16, 2000

(87) PCT Pub. No.: WO99/51414
PCT Pub. Date: Oct. 14, 1999

(30) Foreign Application Priority Data

| Mar. 31, 1998 | (JP) | 10-086267 |
| Apr. 30, 1998 | (JP) | 10-120167 |
| May 19, 1998 | (JP) | 10-136873 |
| Nov. 17, 1998 | (JP) | 10-327278 |

(51) Int. Cl.[7] .......................... B29C 44/02; B29C 44/58
(52) U.S. Cl. ........................................ 264/51; 425/4 R
(58) Field of Search ........................ 425/4 R; 264/45.4, 264/51

(56) References Cited

U.S. PATENT DOCUMENTS

| 3,837,769 A | * | 9/1974 | Erlenbach | 425/4 R |
| 4,065,530 A | * | 12/1977 | Schaeffer | 264/51 |
| 4,081,225 A | * | 3/1978 | Yaita | 425/4 R |
| 4,192,638 A | * | 3/1980 | Lezier et al. | 264/51 |
| 4,327,045 A | * | 4/1982 | Nishikawa et al. | 425/4 R |
| 4,333,897 A | * | 6/1982 | Hayashi et al. | 425/4 R |
| 4,482,306 A | * | 11/1984 | Hahn | 264/51 |
| 4,627,946 A | * | 12/1986 | Crabtree | 425/4 R |

(List continued on next page.)

FOREIGN PATENT DOCUMENTS

| JP | 53-51465 | 5/1978 |
| JP | 61-110534 | 5/1986 |
| JP | 61-140821 | 9/1986 |
| JP | 61-162430 | 10/1986 |
| JP | 1-139244 | 5/1989 |

*Primary Examiner*—Allan R. Kuhns
(74) *Attorney, Agent, or Firm*—Armstrong, Westerman & Hattori, LLP

(57) ABSTRACT

The present invention is constituted such that chambers 13 and 14, independent from cavity 4, are formed at the rear side of a set of dies 2 and 3 for molding a molded foam product, first openings 30a and 30b opening to the cavity 4 are formed along the joint of the dies 2 and 3 as a molding section of the dies 2 and 3, which is to mold a non-outstanding portion of the molded foam product, wherein the first openings 30a and 30b are connected to the external utility pipes 15–18 as different systems for the chambers 13 and 14, via inter-die passages 31a and 31b and internal pipes 32a and 32b, which are connecting passages, so as to supply or exhaust such utility fluid as steam and compressed air to/from the cavity 4 independently from the chambers 13 and 14. Vent holes, which are indispensable for dies of conventional molded foam products, are omitted so that the manufacturing cost of the dies is decreased, maintenance for the dies is simplified, control accuracy of utility fluid is improved, characteristics of the molded foam products are improved, and quality of the molded foam products is also improved.

14 Claims, 12 Drawing Sheets

U.S. PATENT DOCUMENTS

| | | | | |
|---|---|---|---|---|
| 4,698,191 A | * | 10/1987 | Endo et al. | 425/4 R |
| 4,781,555 A | * | 11/1988 | Cook | 425/4 R |
| 4,813,859 A | * | 3/1989 | Bullard et al. | 425/4 R |
| 4,818,451 A | * | 4/1989 | Arai et al. | 425/4 R |
| 5,034,167 A | * | 7/1991 | Masters | 264/51 |
| 5,037,592 A | * | 8/1991 | Erlenbach | 425/4 R |
| 5,085,814 A | * | 2/1992 | Kamiyama et al. | 425/4 R |
| 5,100,597 A | * | 3/1992 | Erlenbach | 264/51 |
| 5,328,345 A | * | 7/1994 | Yamamoto et al. | 425/4 R |
| 5,391,337 A | * | 2/1995 | Kearney et al. | 264/51 |
| 5,711,905 A | * | 1/1998 | Behl | 425/4 R |

* cited by examiner (a)

(b)

SYNTHETIC RESIN INTERNAL FOAM MOLDING MACHINE AND METHOD

BACKGROUND OF THE INVENTION

1. Field of the Invention

The present invention relates to a die-expanded molded foaming apparatus for forming molded foam products using material beads made of thermoplastic synthetic resin, such as polyolefine and polystyrene, and a method therefor.

2. Description of the Related Art

As a die-expanded molded foaming apparatus for manufacturing molded foam products using material beads made of thermoplastic synthetic resin, an apparatus shown in FIG. 10 has been commercialized, wherein a set of dies 100 and 101 are disposed opposite each other, chambers 102 and 103 are disposed at the rear side of the dies 100 and 101 respectively, many vent holes 105 and 106 connecting the chambers 102 and 103 and the cavity 104 are formed in both of the dies 100 and 101, and utility fluid, such as the later mentioned heating steam, is supplied to the cavity 104 or exhausted from the cavity 104 through the vent holes. In the structure of this case, upper utility ports 107 and 108 for supplying heating steam are disposed at the upper part of the respective chambers 102 and 103, and the lower utility ports 109 and 110 connected to a pressure reducing pump and a drain pipe are disposed at the lower part of the respective chambers 102 and 103 so that steam is supplied to the cavity 104.

For actually forming the many vent holes 105 and 106 opened in the dies 100 and 101, a core vent 111, which is a cylindrical body with a cap having an outer diameter of 7–12 mm where a plurality of vent holes 105 and 106, which are approx. 0.5 mmø round holes or approx. 0.5 mm width slits, are opened, is embedded in the respective core vent attachment holes 112, which are opened at a 20–50 mm pitch in the dies 100 and 101, as illustrated in FIG. 11 and FIG. 12.

Using such a die-expanded molded foaming apparatus, pre-expanded material beads are filled into the cavity 104, are heated with the heating steam for foaming and fusing, are cooled and solidified, and then taken out as a molded foam body in a predetermined shape, and the role of the vent holes 105 and 106 in this molded foaming will now be further explained.

In the Japanese Patent Laid-Open No. 57-174223, the process drawing shown in FIG. 13 is included, wherein FIGS. 13(a)–13(d) depict the pre-heat exhausting process for substituting air in the dies and air among the material beads with steam, and the specific content of each process will be explained below. In FIG. 13, a black valve symbol indicates that the valve is closed, and a white valve symbol indicates that the valve is open.

FIG. 13(a) shows an exhaust process, wherein after the material beads are filled in the cavity 104, steam is supplied from the top utility ports 107 and 108 to the chambers 102 and 103 for a very short time, and at the same time, air in the dies, particularly in the chambers 102 and 103, is exhausted from the bottom utility ports 109 and 110 by suction. In this case, pressure inside the chambers 102 and 103 is increased to be a plus pressure by steam so that steam enters among the material beads through the vent holes 105 and 106.

FIG. 13(b) shows a both-side exhaust process, wherein the top utility ports 107 and 108 are closed, and the vacuuming and pressure reducing operation is continued to reduce pressure inside the dies so that air existing in spaces among the material beads is sucked and exhausted through the vent holes 105 and 106 formed in the dies on both sides.

FIG. 13(c) shows a one-side preheating process, wherein the bottom utility ports 109 and 110 are closed and steam is supplied from the top utility port 108 of one chamber 103, which is in a pressure-reduced state, for a short time. In this case, the supplied steam passes sequentially through the vent holes 106 of the die 101, among the material beads in the cavity 104, and the vent holes 105 of the die 100, and flows into the chamber 102 at the opposite side, by which all of the material beads and the dies 100 and 101 are preheated.

FIG. 13(d) shows a one-side preheating process with an opposite flow of steam, wherein, a similar operation is carried out from the chamber 102 side so that air in the cavity 104 is completely exhausted, and at the same time, both dies 100 and 101 are preheated while decreasing the localized temperature difference as much as possible.

FIG. 13(e) shows a heating process for fusion, wherein steam for heating for fusion is supplied to both of the chambers 102 and 103 for heating the dies 100 and 101, and for heating the materials beads as well through the vent holes 105 and 106 of the respective dies 100 and 101, so as to complete foaming, and to mutually fuse the material beads to form the molded foam body.

The vent holes formed in the dies in this manner play an important role as exhaust passages of the air among the material beads or as supply passages of heating steam for obtaining a homogeneous molded foam body, but on the other hand, the following problems have also been recognized.

(1) In order to compensate for strength which is decreased by opening many core vent attachment holes in the dies, the wall thickness of a die made of aluminum alloy material must be set thick, 8–12 mm for example, which increases heat capacity, causing such problems as poor heat efficiency for heating and cooling, or a slow speed of temperature rising and lowering, which drops control accuracy.

(2) Since 2000–4000 core vent attachment holes are opened in a general pair of dies, a complicated drilling operation increases processing cost, and since the core vents are attached manually, this operation is complicated, causing inevitable damage on the surface of the dies, where an extra operation for repair is necessary.

(3) Vent holes are clogged by e.g. scales, causing heat failure, mold releasing failure, and cooling failure, which makes a maintenance operation necessary, such as replacing core vents or periodic cleaning by high pressure cleaning water.

(4) Traces of core vents and vent holes remain on the surface of the molded foam product, which causes a drop in the beauty of the appearance of the molded foam product, and when the outer surface is printed, traces of core vents and vent holes become the cause of dropping printing quality.

(5) After molding, the molded foam product is cooled down by spraying cooling water into the chambers, and at this time moisture infiltrates into the cavity through the vent holes, resulting in the molded foam product containing 6–10% water inside, which makes a drying process necessary. Also the cooling water must be controlled to be a clean state to obtain a clean molded foam product, since the cooling water directly contacts the molded foam product.

(6) Since the material beads are heated for expanding and fusing under the same heating conditions by supplying steam from the chambers to the cavity, the surface property of the molded foam product obtained like this (hereafter equal heating molded foam product) changes depending on the fusion rate of the beads. Specifically, the surface property worsens as the fusion rate decreases, and surface property improves as the fusion rate increases. On the other hand, the at higher the fusion rate of the beads is set for an equal heating molded foam product, the better properties become, such as the mechanical strength of the molded foam product, but heating, expanding and fusing time, and cooling time become longer, which makes the general cycle time of molding longer, decreasing productivity.

For the above reasons, in the above mentioned molding technology, the fusion rate of beads of a molded foam product is set to e.g. 40–80% so as to improve surface property to insure beauty in appearance and to insure mechanical strength by setting a sufficiently high fusion rate, however the fusion rate must be set high enough to insure beauty in appearance even for a molded foam product which does not demand high mechanical strength, therefore cycle time for molding increases and productivity decreases. The fusion rate here is based on an evaluation of the state of beads in a cross-section when the molded foam product is split, and more specifically, the ratio of broken beads determined by measurement, regarding a bead as not fused when the head itself is not broken but has a crack along its surface, and regarding a bead as fused when the bead itself is broken.

SUMMARY OF THE INVENTION

It is an object of the present invention to provide a method for die-expanded molded foaming of synthetic resin and die-expanded molded foam products so as to adjust the internal fusion rate of the molded foam product while improving the beauty in appearance of the molded foam product, and to implement both productivity and commercial value.

A first aspect of the present invention is a die-expanded molded foaming apparatus of synthetic resin, wherein the first openings opening to a cavity are formed in a molding section of a set of dies for molding a molded foam product, which is to mold a non-outstanding portion of the molded foam product, and connecting passages for connecting the first openings and external utility pipes are disposed.

In accordance with this molded foaming apparatus, material beads made of thermoplastic synthetic resin material are filled in the cavity enclosed by the set of the dies, and in this state, the material beads are heated, expanded and fused by supplying heating steam into the cavity, but traces of the first openings do not reduce the beauty in appearance of the molded foam product since the first openings are formed only in a molding section of the dies which is used to mold a non-outstanding portion of the molded foam product.

For the raw material of the material beads, a raw material having characteristics suitable for the working conditions of the molded foam product to be manufactured is selected, where polystyrene synthetic resin material, polyolefine synthetic resin materials such as polyethylene and polypropylene, and a copolymer of these synthetic resin materials can be used. Material beads made of polyolefine synthetic resin material, in particular, are preferable in terms of improving filling property, because the raw material itself is soft and has high gas permeability, which makes it much easier to change the shape of particles than material beads made of polystyrene synthetic resin material having the same expansion ratio.

A second aspect of the invention is the molded foam apparatus, wherein chambers independent from the cavity are formed on the rear side of both of the above mentioned dies, and these chambers and the cavity are connected to utility pipes as separate systems.

In accordance with this molded foaming apparatus, the two chambers at the rear side of the dies are constructed in an independent space from the cavity, and respective heating conditions can be adjusted independently, which allows adjusting the temperatures of the set of the dies independently by steam to be supplied to the two chambers so as to adjust the surface property of the molded foam product contacting the dies, and to adjust the fusion rate of the material beads independently from the surface property by heating, expanding and fusing the material beads filled in the cavity by steam to be supplied to the cavity. This makes it possible to manufacture a molded foam product with a beautiful surface while keeping the internal fusion rate of the molded foam product low to decrease the cycle time of molding, and to implement both productivity and commercial value. Also the cavity and the chambers are not connected by the first opening, which prevents cooling water sprayed in the chambers at cooling from contacting the molded foam product, and to prevent the rise of the moisture content of the molded foam product. The cooling water does not directly contact the molded foam product, which makes it possible to obtain a clean molded foam product without strictly controlling the cooling water to be a clean state.

A third aspect of the present invention is the molded foaming apparatus, wherein the above mentioned first openings are formed in a slit shape along the joint of the set of the dies. According to this structure, the number of core vent attachment holes to be formed in the dies can be minimized or eliminated, which makes it possible to constitute the dies to be thin, decreasing manufacturing cost, and improving the control accuracy of utility fluid, such as steam. Also operations for forming core vent attachment holes and core vent attachment operations are decreased or eliminated, which makes it possible to improve the productivity of the dies, and to decrease or eliminate the maintenance operation required due to the clogging of the vent holes by scales. Also the traces of the core vents and vent holes to be formed on the molded foam product are decreased or eliminated, which further improves the beauty in appearance of the molded foam products.

It is preferable that the connecting passages for connecting the first openings in a slit shape and the external utility pipes are formed from the cavity side to the outside, along the joint of the dies, which is a fourth aspect of the present invention, or the first openings are formed near the joint of the set of the dies, which is a fifth aspect of the present invention. In other words, the joint of the dies is normally formed at the outer edge of the molded foam product, so forming the first openings in such a location is preferable since steam can be supplied evenly in the cavity.

A sixth aspect of the present invention is the molded foaming apparatus wherein the above utility passages are formed at a location which does not include the joint of the dies, and the first openings formed near the joint are opened to these utility passages. If the first openings are formed so as to include the joint of the dies, then the joint portion is worn out by the steam which enters into the cavity from the joint portion, so, to prevent this, it is preferable to form the first openings at a location which does not include the joint.

A seventh aspect of the present invention is the molded foaming apparatus, wherein the first openings are formed in a portion which is exposed to the cavity of an accessory part attached to at least one of the dies. The possible accessory part is at least one of a material beads filling unit and an ejector pin, which is an eighth aspect of the present invention. In other words, traces of the end faces of the filling unit and the ejector pin are always formed on the surface of the molded foam product, and forming the first openings near the filling unit or the ejector pin makes the trace of the first openings non-outstanding, and prevents deterioration of the appearance of the molded foam product.

A ninth aspect of the present invention is the molded foaming apparatus, wherein a plurality of the first openings are formed and divided into two groups, so that the utility fluid can be supplied from the first openings of one group to the first openings of the other group via the cavity. The steam may be supplied and exhausted by connecting independent utility pipes to each one of the first openings, but since a large number of the first openings must be formed to supply steam evenly into the cavity, it is preferable to divide the first openings into two groups, so as to supply the utility fluid from the first openings of one group to the first openings of the other group via the cavity. This is preferable, particularly because operation to substitute air among the material beads filled in the cavity with steam or operation of heating the material beads can be carried out quickly.

A tenth aspect of the present invention is the molded foaming apparatus, wherein second openings opening to a portion where the flow of the utility fluid becomes non-uniform in the cavity, are formed in the dies, and the connecting passage for connecting the second openings and the external utility pipes are disposed. In a portion where the flow of the utility fluid is non-uniform, a density unevenness in filling the material beads and heating and cooling non-uniformity is apt to occur, so it is preferable to form the second openings for dedicated supply and exhaust of the utility fluid in such a portion. A possible example of a portion where the flow of the utility fluid becomes non-uniform is the inner part of a concave area when the concave area is formed in the dies, and in this case, it is preferable to form the second openings in the inner part of such a concave area, which is an eleventh aspect of the present invention.

A twelfth aspect of the present invention is the molded foaming apparatus, wherein a pair of the first openings in a slit shape are formed, and when the space between the first openings is 100 mm or more, the second openings are formed on a surface of the die at the intermediate position of the first openings. When the space between the first openings is wide, the flow resistance of the utility fluid increases which makes the flow of the utility fluid non-uniform, so it is preferable to form the second openings in such a location.

The thirteenth aspect of the present invention is the molded foaming apparatus, wherein the second openings and the first openings are connected to the utility pipes as different systems. It is also possible to connect the first openings and the second openings to the utility pipe as a same system, but separate systems make it possible, for example, to first fill the material beads into the concave portion, where filling the material beads is difficult, so as to control the filling density of the material beads to be even, which makes it possible to manufacture molded foam products with better quality.

A fourteenth aspect of the present invention is the molded foaming apparatus, wherein the width of the opening of the first openings and the second openings are set to the outer diameter or less of a material bead to be filled. If the width of the opening of the first and second openings exceed the outer diameter of a material bead, the material beads flow out of the cavity through the openings, so the width of the opening of both openings is set to the outer diameter or less of a material bead.

A fifteenth aspect of the present invention is the molded foaming apparatus, wherein the first openings and the second openings are formed by disposing a replaceable opening forming element to the dies. Since such a utility fluid as heating steam flows through the openings, the abrasion of the openings is inevitable. Therefore a replaceable opening forming element may be disposed at the dies so that the opening forming element can be replaced when the openings are worn out.

A sixteenth aspect of the present invention is a method for die-expanded molded foaming of synthetic resin, wherein using the die-expanded molded foaming apparatus of synthetic resin according to one of the first to fifteenth aspects where the chambers independent from the cavity are formed on the rear side of the set of dies respectively so as to supply steam as the utility fluid independently to the cavity and both chambers, the heating conditions for both of the chambers and the heating conditions for the cavity are controlled in a state where material beads made of thermoplastic synthetic resin are filled in the cavity, and the material beads filled in the cavity are heated, expanded and fused while controlling the internal fusion rate at will with maintaining the surface property of the molded foam product.

In accordance with this molded foaming method, wherein the heating conditions in the cavity and a set of the chambers are independently controlled, the surface property of the molded foam product contacting the dies can be adjusted by adjusting the temperature of the set of the dies independently by the steam to be supplied to the two chambers, and the fusion rate of the material beads can be adjusted independently from the surface property by heating, expanding and fusing the material beads filled in the cavity by the steam to be supplied to the cavity. This makes it possible to decrease the cycle time of molding while keeping the internal fusion rate of the molded foam product low, and to manufacture molded foam products with a beautiful surface as well, consequently both productivity and commercial value can be implemented.

A seventeenth aspect of the present invention is a method for molded foaming, wherein a plurality of the first openings are divided into two groups, and the internal fusion rate is controlled at will with maintaining the surface property of the molded foam product, while independently controlling the four heating conditions, that is, the heating conditions for the cavity and the heating conditions for both of the chambers for these two groups. Heating conditions for the set of the chambers may be controlled together, but it is preferable to control the respective chambers independently since the surface property of a surface at one die side and the surface property of a surface at the other die side of the molded foam product can be controlled independently.

An eighteenth aspect of the present invention is a method for molded foaming, wherein the steam pressure and time are controlled as heating conditions. It is also possible to control the steam temperature as a heating condition but controlling the steam pressure and time is preferable, since conventional steam equipment which has been used at a factory can be used, and equipment for control can be constructed at low cost.

BRIEF DESCRIPTION OF THE DRAWINGS

FIGS. 10–13 are drawings related to prior art, wherein FIG. 10 is a general structural drawing of a die-expanded molded foaming apparatus, FIG. 11 is a longitudinal section of an area near a core vent, FIG. 12 is a plan view of core vents, and FIG. 13 is a drawing depicting a method for molding a molded foam body.

DESCRIPTION OF THE PREFERRED EMBODIMENTS

Embodiments of the present invention will now be described with reference to the accompanying drawings.

Figure 1:
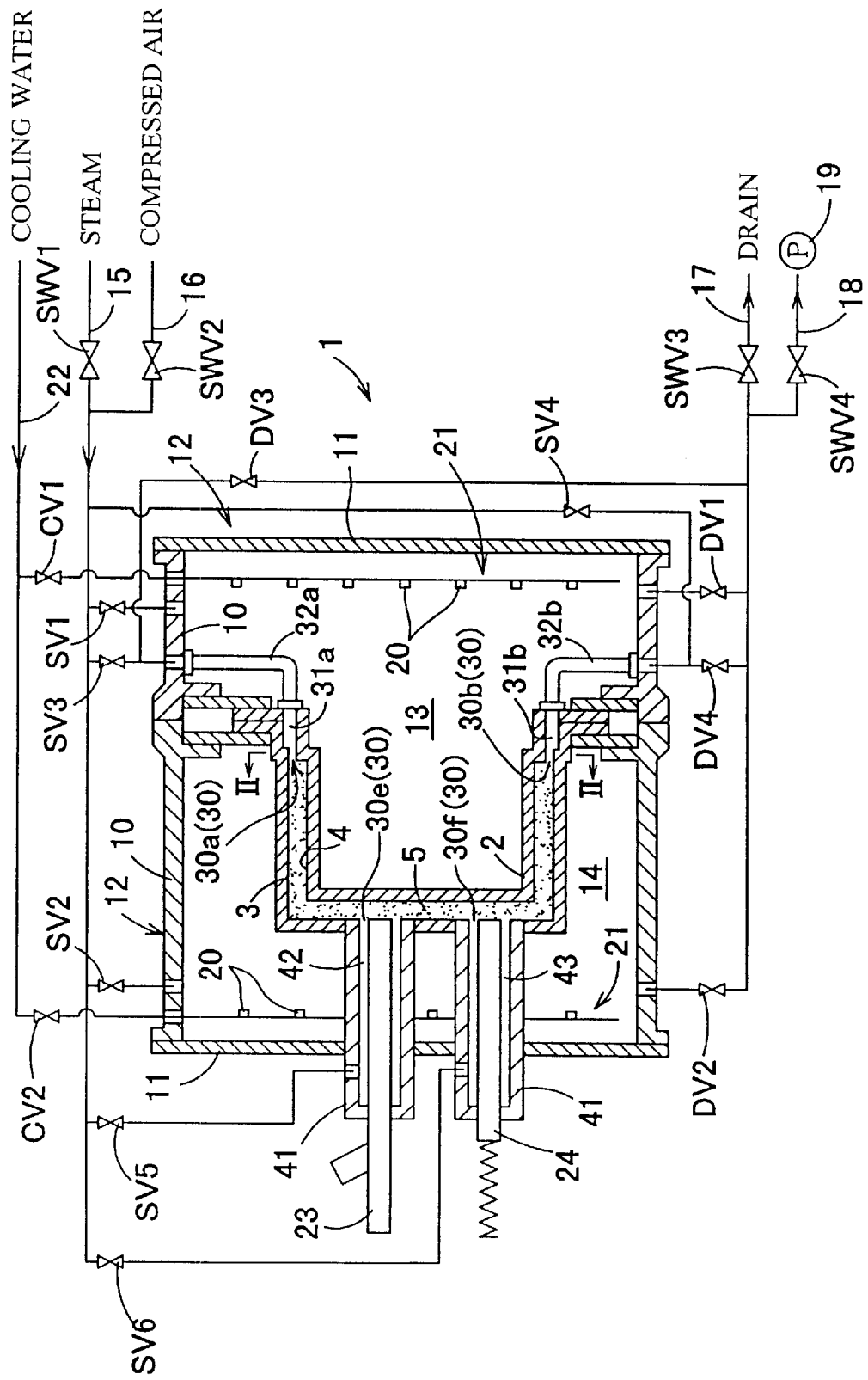
FIG. 1 is a general structural drawing of a die-expanded molded foaming apparatus according to the invention.
Figure 2:
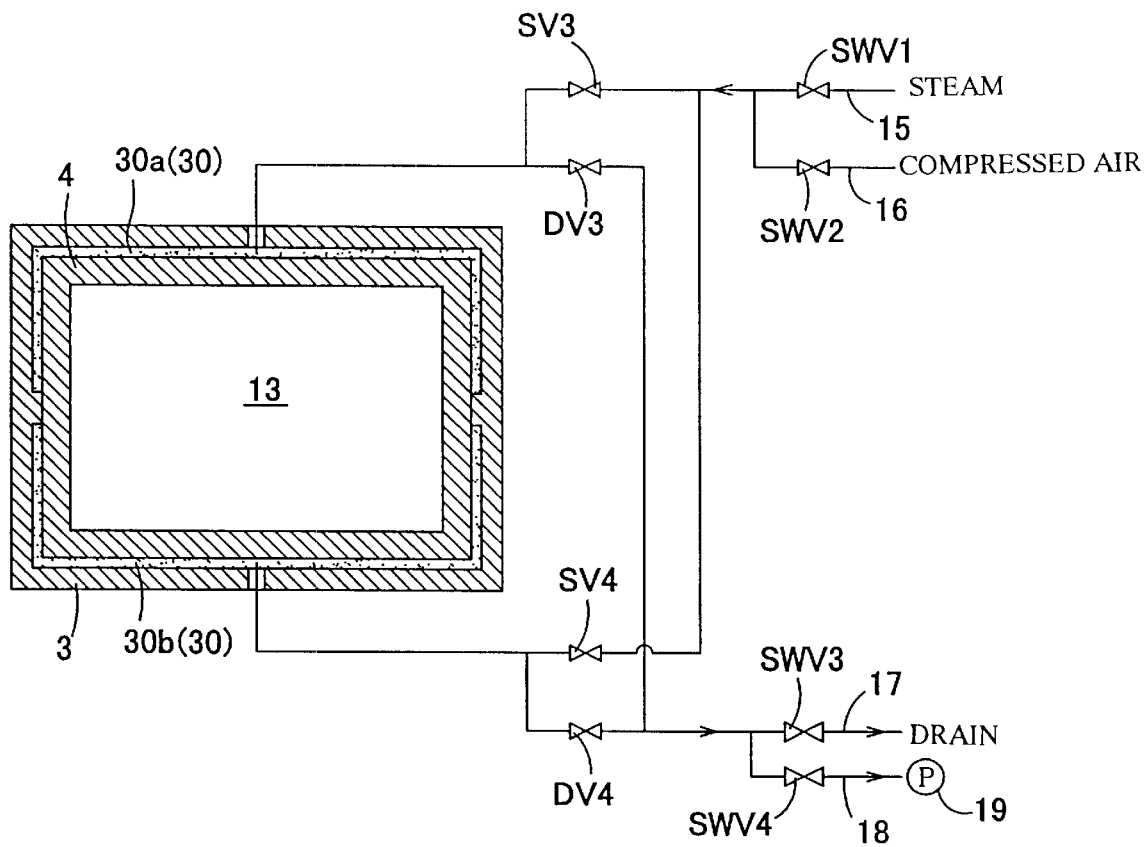
FIG. 2 is a II—II cross-sectional drawing of FIG. 1.

As FIG. 1 and FIG. 2 show, a die-expanded molded foaming apparatus 1 comprises a core die 2 and a cavity die 3, which are a set of dies disposed opposite each other, beads filling means for filling material beads 5 into a cavity 4, which is formed by the core die 2 and cavity 3 by air flow, pressure reducing means for reducing pressure inside the cavity 4, compressed air supply means for supplying compressed air into the cavity 4, steam supply means for heating the material beads 5 filled in the cavity 4 by steam and expanding and fusing the material beads, and cooling means for cooling the molded foam product.

As a raw material of the material beads 5, a raw material having characteristics suitable for e.g. the working conditions of the molded foam product to be manufactured is selected, where polystyrene synthetic resin material, polyolefine synthetic resin materials, such as polyethylene and polypropylene, and a copolymer of these synthetic resin materials can be used.

The expansion ratio of the material beads 5 is preferably in a range of 3–150 times, although this depends on the raw material of the material beads 5. Specifically, in the case of the material beads made of polystyrene synthetic resin material, 3–100 times, more preferably 3–80 times, is suitable, and in the case of the material beads made of polyolefine synthetic resin material, 3–90 times, more preferably 3–60 times, is suitable. Material beads made of polyolefine synthetic resin material, in particular, are preferable in terms of improving filling property, because the raw material itself is soft and has high gas permeability, which makes it much easier to change the shape of particles than material beads made of polystyrene synthetic resin material having the same expansion ratio.

The core die 2 and the cavity die 3 are respectively attached to a housing 12 having a frame 10 and a backboard 11, and a set of a first chamber 13 and a second chamber 14 are formed on the rear side of the core die 2 and the cavity die 3 respectively.

The first chamber 13 and the second chamber 14 are connected to a steam supply pipe 15 and an air supply pipe 16 respectively via utility valves SV1 and SV2 and switching valves SWV1 and SWV2, and at the same time, are connected to a drain pipe 17 and a pressure reducing pipe 18 with a vacuum pump 19 respectively via drain valves DV1 and DV2 and switching valves SWV3 and SWV4. In the first and second chambers 13 and 14, a nozzle unit 21 having a plurality of nozzles 20 for spraying cooling water to the rear faces of the core die 2 and cavity die 3 is disposed respectively, and both of the nozzle units 21 are connected to a cooling water supply pipe 22 via cooling water valves CV1 and CV2.

The first characteristic configuration of the present invention is that the first openings 30 opening to the cavity 4 are formed in a molding section for molding of the core die 2 and the cavity die 3 which is to mold a non-outstanding portion of the molded foam product, and connecting passages for connecting the first openings 30 to the external utility pipes 15–18 are disposed, so that such utility fluid as steam and compressed air can be independently supplied or exhausted from a plurality of the first openings 30 to the cavity 4 by operation of the utility valves SV3–SV6, the drain valves DV3–DV4, and switching valves SWV1–SWV4.

The position for forming the first openings 30 can basically be classified into three types: forming at or near the joint of the core die 2 and the cavity die 3, forming near a portion of accessory parts, such as a filling unit 23 and an ejector pin 24, exposed to the cavity 4, and a combination of the above two types.

First the type forming the first openings 30 at or near the joint of the core die 2 and the cavity die 3 will be explained using three types of examples.

(1) In the first type die-expanded molded foaming apparatus 1, as shown in FIG. 1 and FIG. 2, the slit shaped first openings 30a and 30b opening to the cavity 4 are disposed along the joint portion of the core die 2 and the cavity die 3, and inter-die passages 31a and 31b and internal pipes 32a and 32b are disposed as connecting passages for connecting the first openings 30a and 30b and the external utility pipes 15–18, wherein no conventional vent holes are formed in the core die 2 and the cavity die 3, so that the cavity 4 is air-tightly isolated from both of the chambers 13 and 14 when the dies are closed, and at the same time, the first openings 30a and 30b which lead to the external utility pipes 15–18 are formed between the core die 2 and the cavity die 3. It is most preferable to air-tightly isolate the cavity 4 from both chambers 13 and 14 in this manner, but forming a small number of conventional vent holes connecting the cavity 4 and both of the chambers 13 and 14 is also embraced in the present invention.

In accordance with the above configuration, the above mentioned preheating and exhausting process and fusion heating process for the material beads 5 can be carried out in the following procedure using these first openings 30a and 30b, rather than conventional vent holes.

In the preheating and exhausting process, pressure inside the cavity 4 is directly reduced by reducing pressure and exhausting from the first opening 30a or the first opening 30b, then steam for preheating is directly supplied to the cavity 4 in the same manner, and in the fusion heating process, steam at fusing temperature is directly supplied from the first opening 30a or the first opening 30b to the material beads 5 in the cavity 4.

In order to prevent clogging of the first openings 30a and 30b by the material beads 5, the width of the opening of the first openings 30a and 30b at the cavity 4 side must be formed to be the size of the outer diameter of a material bead 5 to be filled, which is 1–10 mmø or less, and in order to finish the molded foam body nicely without flashes and burrs, the width of the opening should be as small as possible, but if the width of the opening is too small, the passing resistance of the utility fluid increases, so consequently 0.1–0.5 mm is suitable for the opening width.

In the present invention, it is suitable to dispose the first openings 30a and 30b at the joint of the core die 2 and the cavity die 3 along the base portion of the concave part. In this case, the slit shaped first openings 30a and 30b come to the convex ridge line part at the peripheral of the molded foam body, so appearance is not affected even if small flashes remain.

For the internal pipes 32a and 32b, using copper pipes with 4–15 mmø is appropriate.

FIG. 1 shows two sets of connecting passages, that is, a single connecting passage comprised of the first opening 30a, the inter-die passage 31a and the internal pipe 32a, and another single connecting passage comprised of the first opening 30b, the inter-die passage 31b and the internal pipe 32b, but the present invention is not restricted by this aspect, and three or more sets, or a single set can be used according to the shape and size of the molded foam body to be obtained.

When a plurality of the first openings 30 are formed, a pair of the first openings 30a and 30b, for example, it is preferable to dispose the openings opposite each other at the joint of the dies 2 and 3 located on the opposite sides at both opposing ends of the cavity 4. The length of the first openings 30a and 30b is not especially restricted, but this configuration is preferable because the utility fluid, such as steam, can be supplied from one of the first openings to the other first opening via the cavity, and particularly, operation for substituting air among the material beads 5 filled in the cavity 4 with steam, or operation for heating the material beads 5, can be carried out quickly.

(I) Since a large number of core vent attachment holes, such as a conventional type, do not have to be formed in the dies 2 and 3, strength does not drop, the 8–12 mm wall thickness of a conventional aluminum alloy die can be decreased to a 4–8 mm wall thickness, and as a result, heat capacity decreases, heat efficiency for heating/cooling improves, temperature control accuracy improves, and material cost can be decreased.

(II) Since drilling of core vent attachment holes and core vent attachment operations are unnecessary, processing cost can be considerably decreased, and manufacturing cost for the dies 2 and 3 can be decreased.

(III) Since a heating failure, mold releasing failure and cooling failure caused by clogging do not occur, such maintenance operations as replacing core vents or periodic cleaning by high pressure cleaning water is completely unnecessary.

(IV) Since traces of core vents and vent holes do not remain on the surface of the product, appearance quality improves and problems with surface printing and seal labeling processes are solved.

(V) Since cooling water used in the cooling process does not enter the cavity, moisture content in the molded foam product decreases from the conventional 6–10% to 0.5–4%, which makes a drying process unnecessary, and largely contributes to decreasing cycle time.

(VI) The biggest advantage of the present invention is that the utility operation, which could not be implemented with conventional dies, is possible. For such a utility fluid as steam to act on the material beads 5, conventionally the utility fluid supplied from the utility pipes act on one of the chambers, then act on the material beads via the vent holes, whereas in this invention, where utility passages for the cavity 4 are separated and are independent from the chambers 13 and 14, such utility fluid as pressurizing air, steam, pressure reducing air and cooling water, directly act in the cavity 4 via the first openings 30a and 30b, therefore the flexibility of the utility operation expands.

When pressure in the cavity 4 is to be decreased, for example, pressure of both chambers must be reduced as well in the case of conventional dies, but in accordance with the present invention, it is possible to carry out the pressure reducing operation only for the cavity 4, which capacity is 1/10 that of the chamber. Since response is quicker than a conventional type, operability is considerably improved.

Since the chambers 13 and 14 are constituted in a space independent from the cavity 4, and heating conditions for each space can be adjusted independently, the temperature of the set of the dies 2 and 3 can be adjusted independently for each die by steam to be supplied to the two chambers 13 and 14 so as to adjust the surface property of the molded foam product contacting the dies 2 and 3, and the material beads filled in the cavity 4 are heated, expanded and fused by steam to be supplied to the cavity 4, so as to adjust the fusion rate of the material beads 5 independently from the surface property. This makes it possible to manufacture molded foam products with a beautiful surface while keeping the internal fusion rate of the molded foam product low to decrease the cycle time of molding, and as a result, both productivity and commercial value can be implemented.

Figure 3:
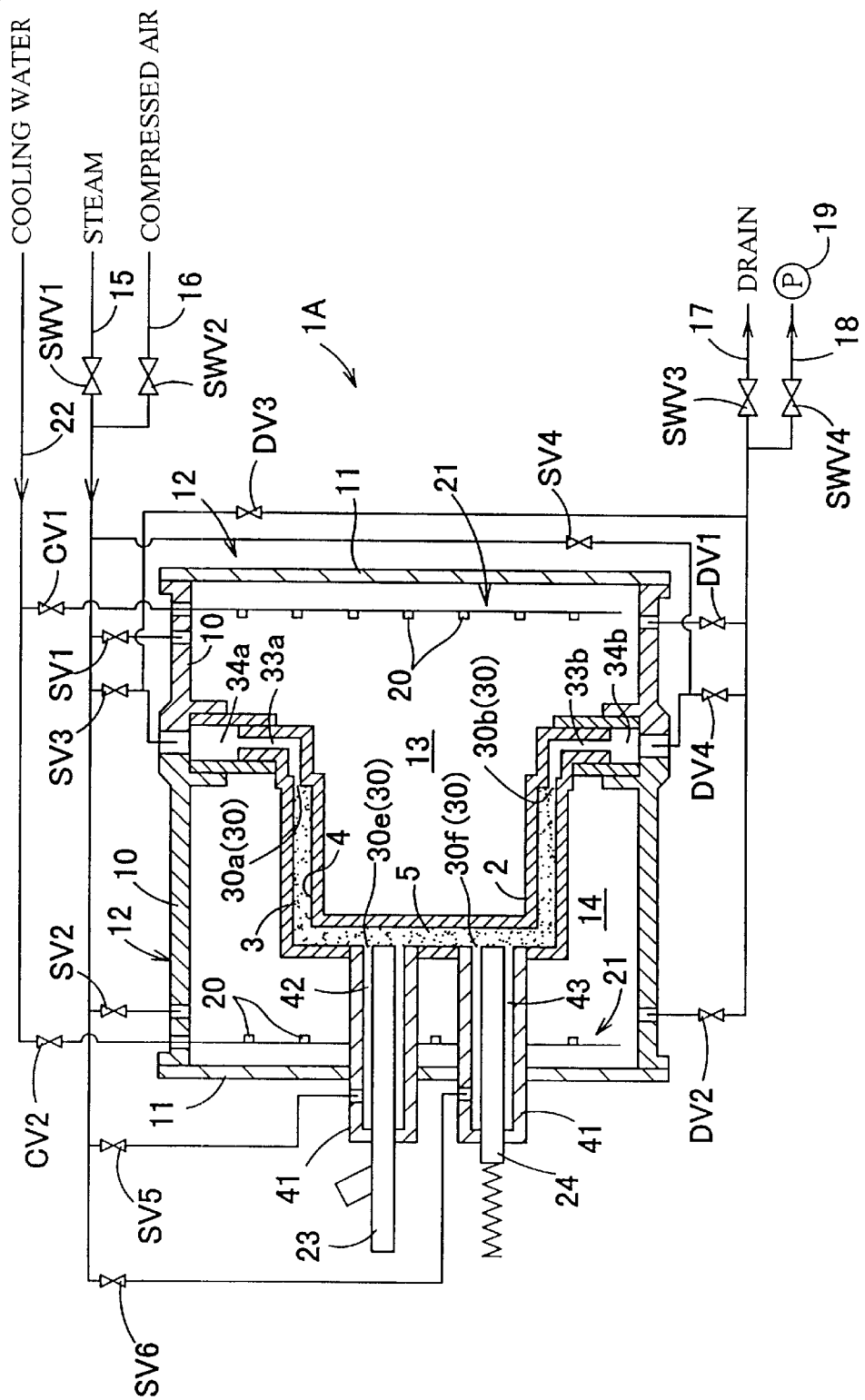
FIG. 3 is a general structural drawing of a die-expanded molded foaming apparatus according to the invention having another configuration.

(2) In the second type die-expanded molded foaming apparatus 1A, as connecting passages connecting the slit shaped first openings 30a and 30b to the external utility pipes 15–18, inter-die passages 33a and 33b are formed along the joint portion of the dies 2 and 3 from the cavity 4 side to the outside, and inter-die spaces 34a and 34b are formed surrounded by the joint portion of the frames 10 when the dies are closed, as shown in FIG. 3. Since the other structure is the same as the die-expanded molded foaming apparatus 1, identical parts are denoted by the same reference characters for which a detailed description is omitted.

In the die-expanded molded foam apparatus 1A, conventional vent holes are not formed in the dies 2 and 3, and when the dies are closed, the cavity 4 is formed air-tightly isolated from both chambers 13 and 14, and the first openings 30a and 30b and the connecting passages for connecting these first openings 30a and 30b to the utility pipes 15–18, that is, inter-die passages 33a and 33b and inter-die spaces 34a and 34b, are formed along the joint of both dies 2 and 3 and the frame from the cavity 4 side to the outside, in a mode which is different from the first type die-expanded molded foaming apparatus 1.

Figure 4:
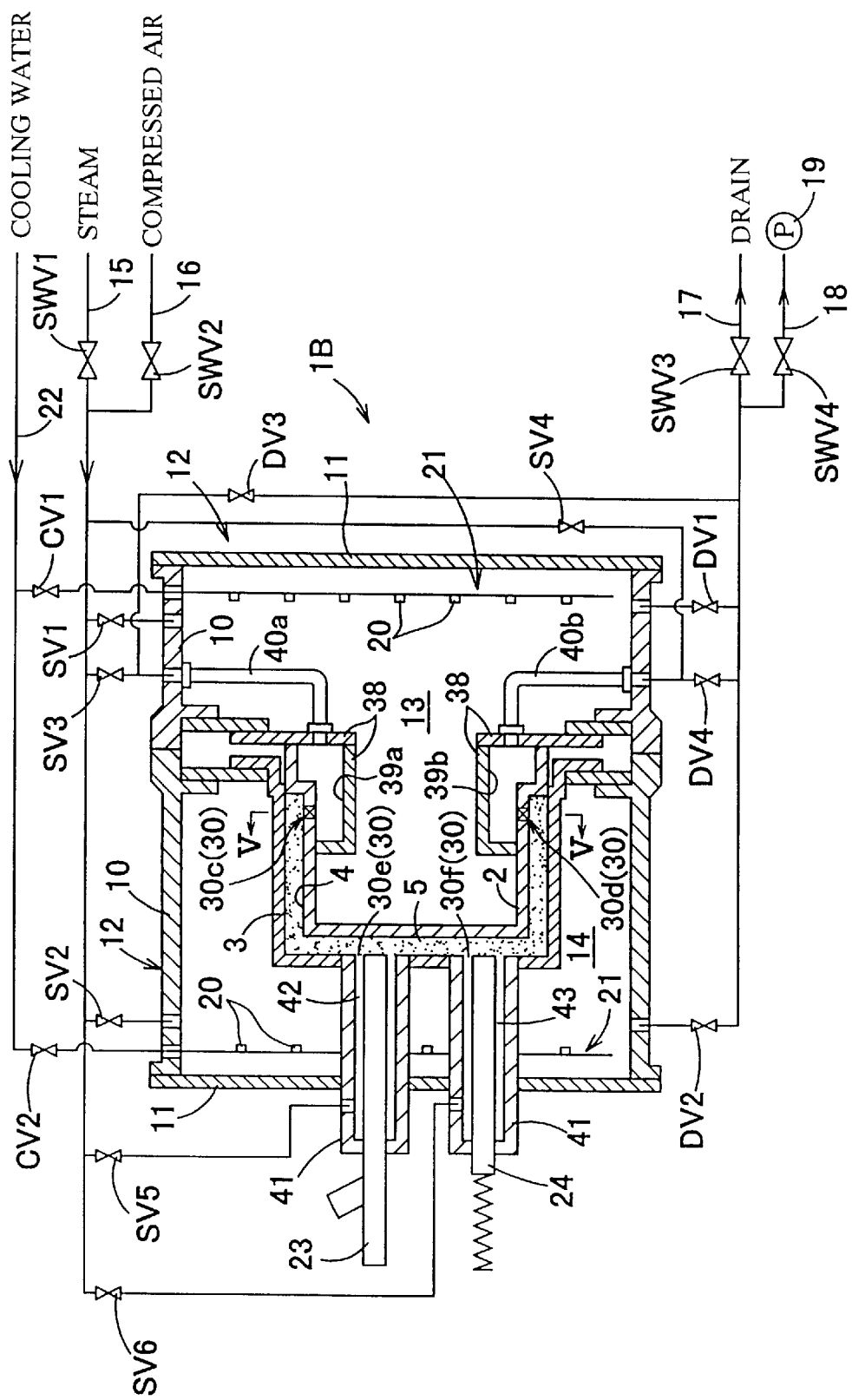
FIG. 4 is a general structural drawing of a die-expanded molded foaming apparatus of the invention having another configuration.
Figure 5:
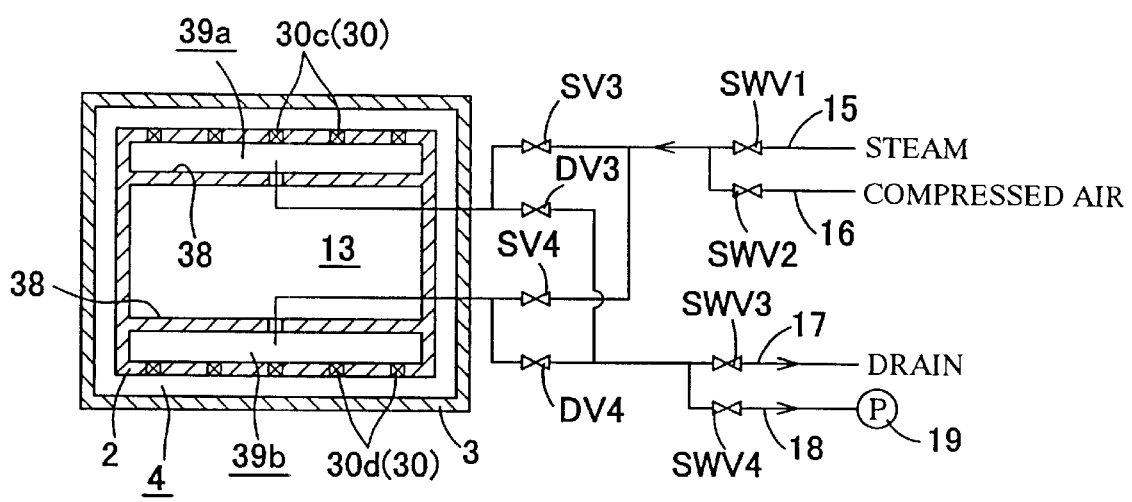
FIG. 5 is a V—V cross-sectional view of FIG. 4.

In accordance with the molded foaming apparatus 1A shown in FIG. 3, the utility fluid can be operated during molding, just like the die-expanded molded foaming apparatus 1, therefore all the above mentioned advantages, (I)–(VI), are also available here, and in addition, independent internal pipes 32a and 32b, which would require piping working at manufacturing, are unnecessary, therefore manufacturing cost of the molded foaming apparatus is decreased and maintenance is also unnecessary. (3) In the third type die-expanded molded foaming apparatus 1B, as shown in FIG. 4 and FIG. 5, the first openings 30c and 30d opening to the cavity 4 are formed in the core die 2 near the joint of the core die 2 and the cavity die 3, connecting spaces 39a and 39b made of the passage formation element 38 fixed inside the core die so as to surround the first openings 30c and 30d and the internal pipes 40a and 40b for connecting the connecting spaces 39a and 39b to the external utility pipes 15–18 are disposed, as connecting passages for connecting the first openings 30c and 30d to the external utility pipes 15–18, so that the utility fluid can be supplied or exhausted independently to the first openings 30c and 30d via the connecting spaces 39a and 39b and the internal pipes 40a and 40b. Since the other structure is the same as the die-expanded molded foaming apparatus 1, identical parts are denoted by the same reference characters for which a detailed description is omitted.

In the die-expanded molded foaming apparatus 1B, conventional vent holes for connecting the cavity 4 and the chamber 13 and 14 are not formed in the dies 2 and 3, and when the dies are closed, the cavity 4 is formed air tightly isolated from the chamber 12 and 13, and the first openings 30c and 30d and the connecting passages for connecting these first openings 30c and 30d to the utility pipes 15–18, that is, the connecting spaces 39a and 39b and the internal pipes 40a and 40b, are formed in a mode different from the above two cases.

For the first openings 30c and 30d, through holes or slits may be formed directly in the core die 2, but in this case, the inner surface may be worn out by the passing steam, so it is preferable to form core vent attachment holes corresponding to the first openings 30c and 30d and to attach removable core vents just like a conventional molded foaming apparatus.

In accordance with the molded foaming apparatus 1B shown in FIG. 4 and FIG. 5, the utility fluid can be operated during molding, just like the die-expanded molded foaming apparatus 1, therefore the above mentioned advantages, (V) and (VI), are also available here. Since the core vents for connecting the cavity 4 and the connecting spaces 39a and 39b are formed, the above mentioned advantages, (I)–(IV), are not available, but the number of the core vents can be much less because the core vents are not formed uniformly on the entire surface of the dies as conventional types. Also the abrasion of the first openings 30c and 30d by steam can be easily prevented, which makes design more practical. In this third type molded foaming apparatus 1B as well, it is possible to form inter-die spaces between the joints of the left and right frames 10, just like the second type molded foaming apparatus, omitting the internal pipes 32a and 32b.

In the case shown in FIG. 4, the first openings 30c and 30d are formed at the core die 2 side, but if the inner surface side (core die 2 side) of the molded foam product is exposed to the outside, it is preferable to form the first openings 30c and 30d at the cavity die side in terms of improving the beauty of the molded foam product.

Now the case when the first openings 30 are formed near the accessory parts, such as the filling unit 23 and the ejector pin 24, will be explained.

When the first openings are formed near the accessory parts, as shown in FIG. 1, FIG. 3 and FIG. 4, outer elements 41 having roughly a cylindrical shape are fixed at positions which correspond to the filling unit 23 and the ejector pin 24 of the cavity die 3, the filling unit 23 and the ejector pin 24 are inserted and set in the outer elements 41, the connecting passages 42 and 43 for independently connecting to the utility pipes 15–18 are formed among the filling unit 23, the ejector pin 24 and the outer elements 41, the first openings 30e and 30f opening to the cavity 4 are formed at the tip of the connecting passages 42 and 43 respectively, and the utility pipes 15–18 are connected to the connecting passages 42 and 43 via the utility valves SV5 and SV6, so as to supply required steam and pressurizing air or to carry out the pressure reducing operation, just like the case of the above mentioned first openings 30a–30d.

In this case, the object of the present invention can be achieved by disposing the first openings 30e and 30f alone without disposing the first openings 30a–30d, but it is preferable to dispose the first openings 30a–30d as well.

It is also preferable to dispose the first openings 30e and 30f near the tip of the filling unit 23 and the ejector pin 24 along with the above described first openings 30a–30d, as shown in FIG. 1, FIG. 3 and FIG. 4, and form independent passages connecting the respective first openings 30 to the external utility pipes 15–18. In this case, the first opening 30 which can supply utility fluid is disposed to at least three locations, which is at both opposing ends of the cavity 4 and at the center part of the cavity 4, therefore utility fluid can be supplied as the demanded quality and the flexibility of control operation expands, such as to supply and stop utility fluid, and as a consequence, an optimum utility operation is carried out according to the type and shape of the molded foam body.

In the case shown in FIG. 1, FIG. 3 and FIG. 4, the first openings 30e and 30f are disposed near the tip of the filling unit 23 and the ejector pin 24, but the present invention is not restricted by this mode, and it is also possible to use other accessory parts which are attachable to the dies, such as the cooling water pipe fitting. As long as steam is supplied uniformly into all the material beads 5 in the cavity 4, it is unnecessary to form the connecting passages 42 and 43 outside the filling unit 23 and the ejector 24, and one or both of the first openings 30e and 30f can be omitted, where the first openings 30e and 30f are formed appropriately according to e.g. the shape of the molded foam product to be molded. The first openings 30a–30d may be formed as dedicated openings for exhausting steam supplied from the first openings 30e and 30f to the cavity 4. In FIG. 1, FIG. 3 and FIG. 4, the filling unit 23 and the ejector pin 24 are formed at the cavity die 3 side, but if the outer surface side (cavity die 3 side) of the molded foam product is exposed to the outside, it is preferable to dispose the filling unit 23 and the ejector pin 24 at the core die 2 side in terms of improving the beauty of the molded foam product.

The second characteristic of the present invention is that second openings 50 are formed in a portion of the above mentioned dies 2 and 3 where the flow of the utility fluid becomes non-uniform in the cavity, and the connecting passages for connecting the second openings 50 and the external utility pipes are disposed so that such utility fluid can be supplied or exhausted.

Figure 6:
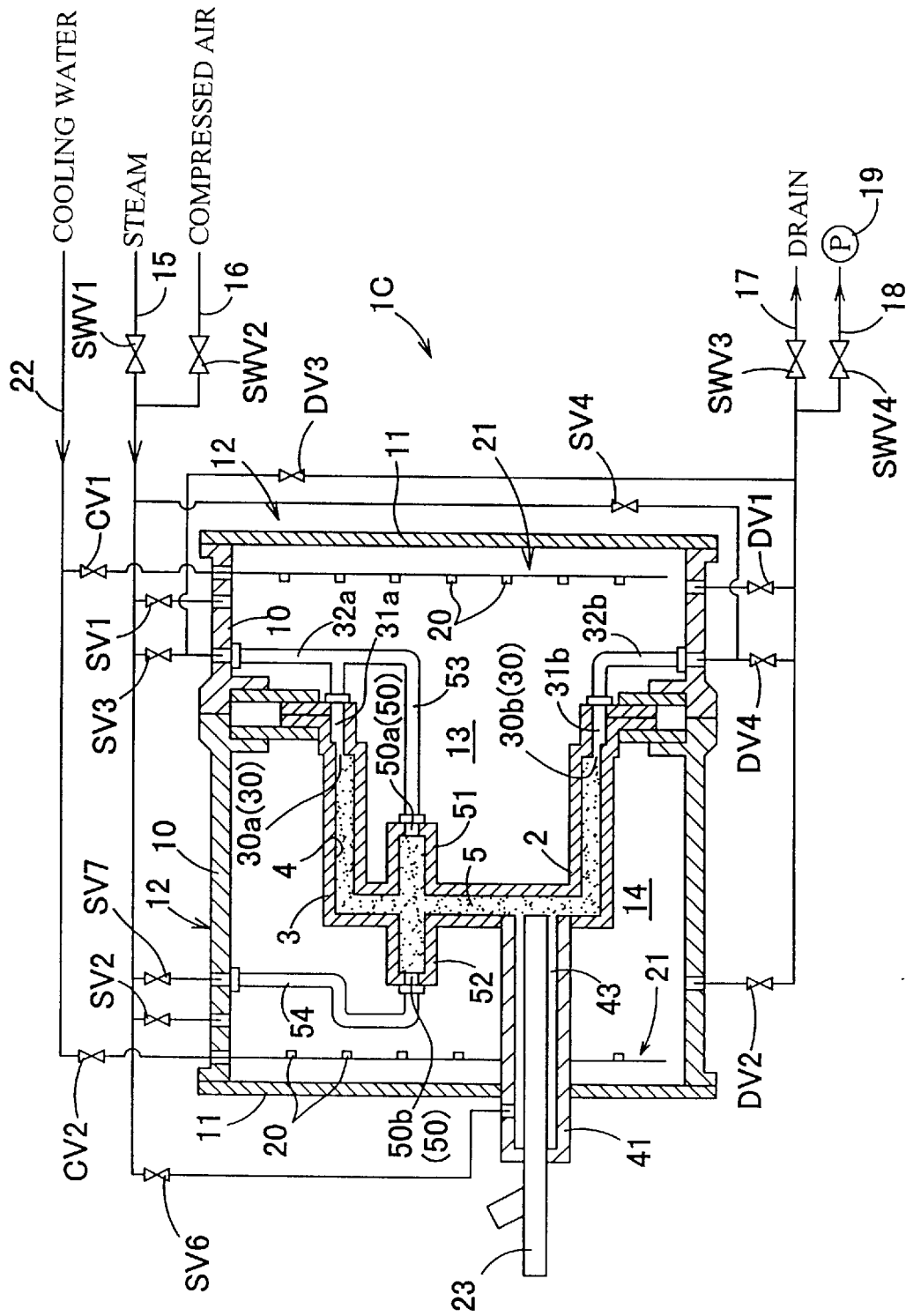
FIG. 6 is a general structural drawing of a die-expanded molded foaming apparatus of the invention having another configuration.
Figure 7:
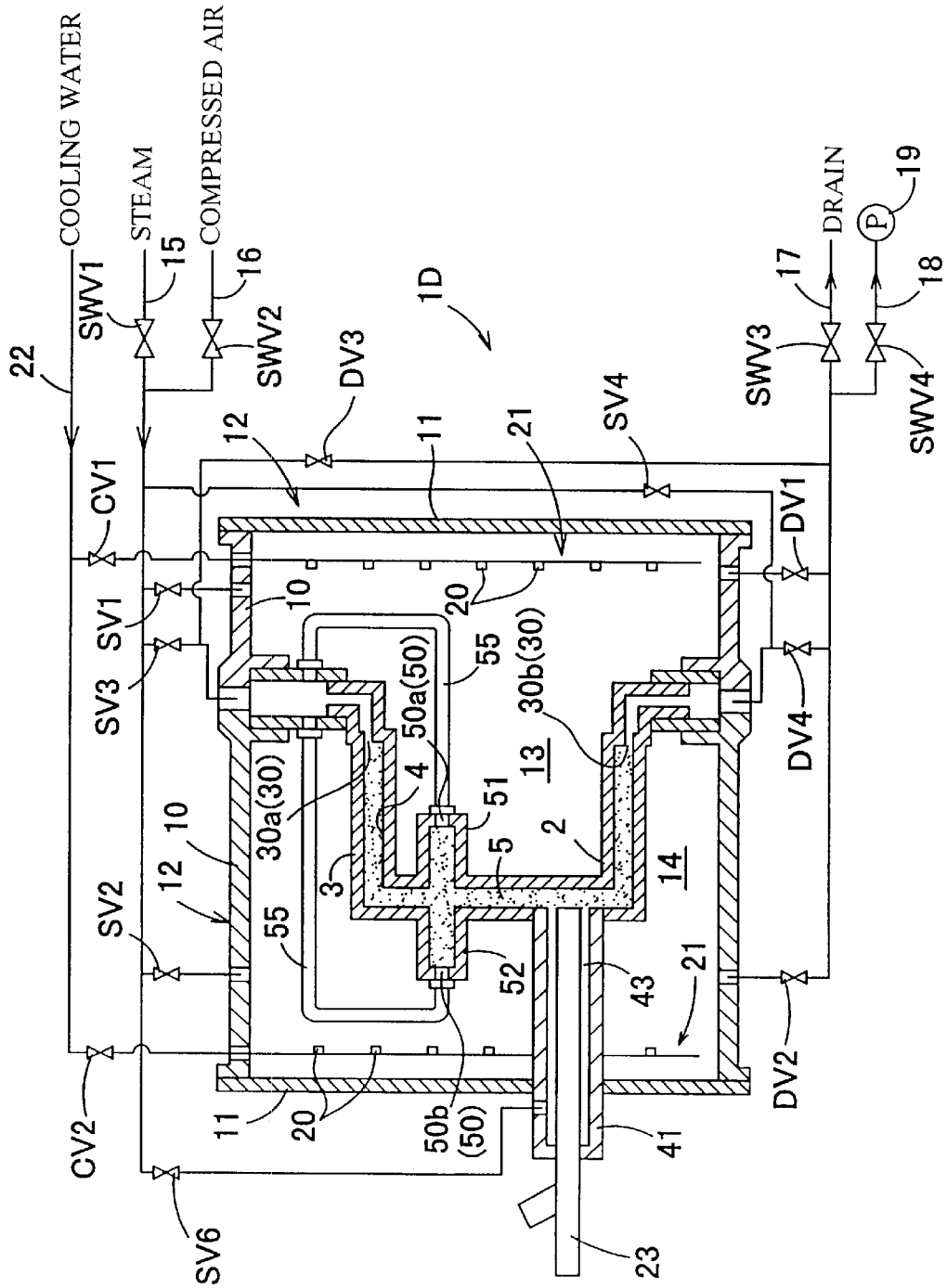
FIG. 7 is a general structural drawing of a die-expanded molded foaming apparatus of the invention having another configuration.
Figure 8:
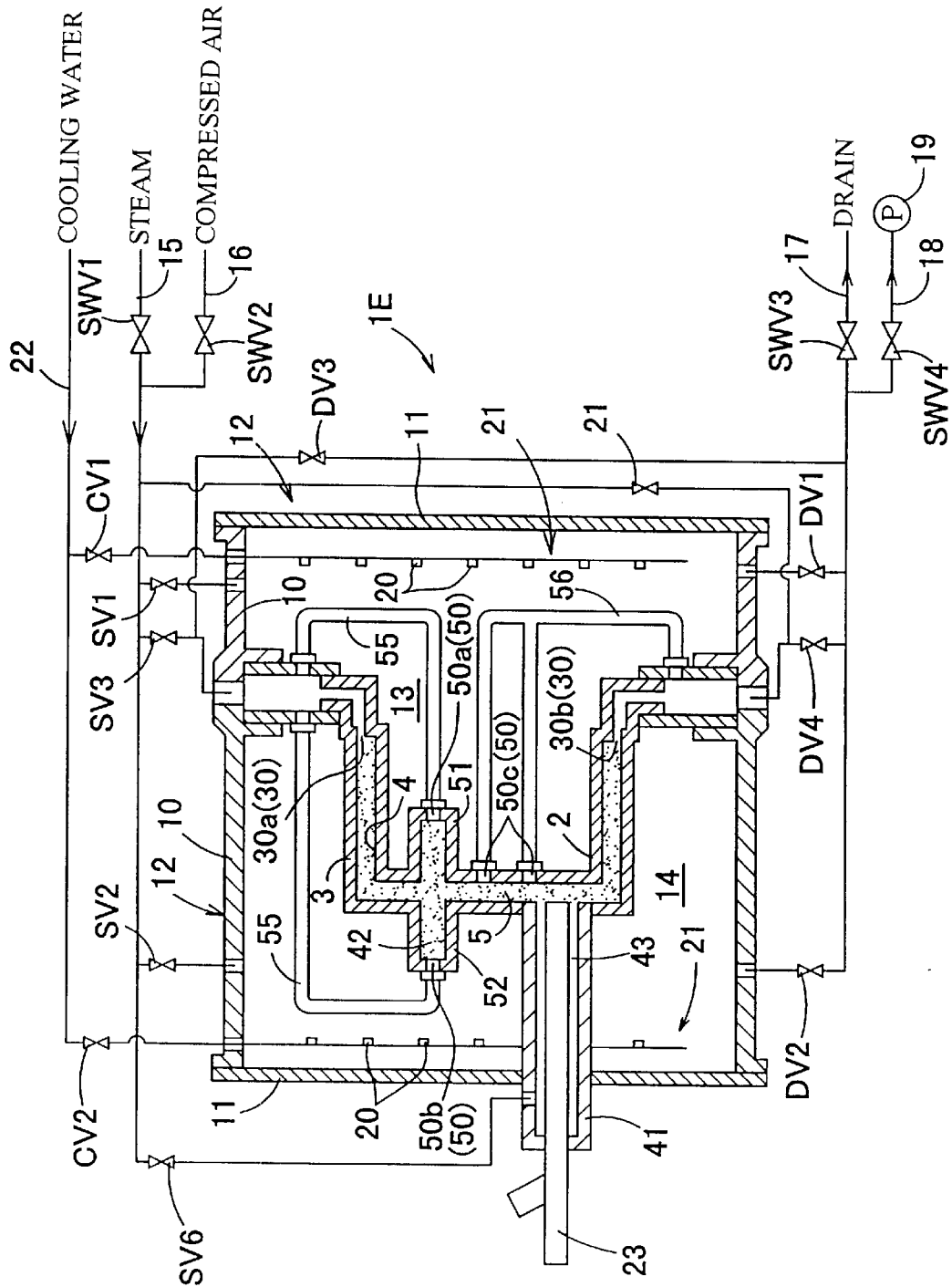
FIG. 8 is a general structural drawing of a die-expanded molded foaming apparatus of the invention having another configuration.

Portions where the flow of the utility fluid become non-uniform are, for example, the inner parts of concave areas 51 and 52 when the concave areas 51 and 52 are formed in the dies 2 and 3, as shown in FIG. 6–FIG. 8, and the center portion of the dies 2 and 3, as shown in FIG. 8, but there may be other portions as well.

The second openings 50 can be point shaped similar to conventional core vents or slit shaped having some length, but in either case, the width of the opening at the cavity 4 side must be the outer diameter size or less of a material bead 5 to be filled, so that the opening is not clogged by the material bead 5.

(1) When the second openings 50 are formed in the concave portions 51 and 52, the second openings 50a and 50b opening to the inner parts of the concave areas 51 and 52 are formed, as shown in the die-expanded molded foaming apparatus 1C in FIG. 6, where the second opening 50a is connected to the internal pipe 32a via the internal pipe 53, and the second opening 50b is connected to the independent internal pipe 54 and to the utility pipes 15–18 via the utility valve SV7. The second openings 50a and 50b may be connected to the utility pipes 15–18 via the internal pipes 32a and 32b, or may be directly connected to the utility pipes 15–18.

Since the second openings 50a and 50b independently connected to the external utility pipes 15–18 are formed in the inner parts of the concave areas 51 and 52 where the flow of the utility fluid become non-uniform, such utility operations as the supply of steam, supply of compressed air, and exhaust for vacuuming the cavity 4, or the adjustment of pressure in the cavity 4 and discharge of draining from the cavity 4, can be carried out independently via the second openings 50a and 50b according to the requirement, just like the cases of the above first openings 30a and 30b, therefore the non-uniformity of the utility fluid can be solved.

In accordance with the die-expanded molded foaming apparatus 1C, as the configuration clearly shows, the following matters become possible using the first openings 30a and 30b and the second openings 50a and 50b, instead of the conventional vent holes, in the molded foaming method where the above mentioned pre-expanded material beads 5 are filled in the cavity 4, pressure is reduced and exhausted, the beads are heated, expanded, and fused by the heating steam, then cooled down and solidified, and are taken out as a molded foam body made of the predetermined expandable synthetic resin.

For example, at exhausting with reducing pressure, after pressure inside the cavity is directly reduced by exhausting with reducing pressure from one or both of the first openings 30a and 30b, and steam for preheating is then directly supplied in the same manner, and at this time, if necessary, non-uniformity of the utility fluid in the concave areas 51 and 52 can be solved by using the second openings 50a and 50b.

For heating and fusing, steam at fusing temperature can be directly supplied to the material beads 5 in the cavity 4 from one or both of the first openings 30a and 30b in the same manner, and steam is supplied to the concave areas 51 and 52 using the second areas 50a and 50b in the same manner so as to heat the portions where heat cannot easily reach merely by steam from the first openings 30a and 30b. In this case, it is needless to say that all of dies 2 and 3 can be heated from the rear faces by supplying the required steam from the chambers 13 and 14 if necessary.

When the second openings 50a and 50b are formed in the molded foam apparatus 1A shown in FIG. 3, the internal pipes 55 for connecting the second openings 50a and 50b and the inter-die spaces 34a are disposed as shown in the die-expanded molded foaming apparatus 1D in FIG. 7, for example. In this case, at least one of the internal pipes 55 may be connected to the utility pipes 15–18 independently via the utility valve, not illustrated here.

In accordance with this embodiment, in addition to the above mentioned advantages, molding operation time can be decreased because at heating or cooling for molding, the inter-die passages 33a and 33b, which are parts of the dies 2 and 3 where heat capacity is relatively large, and the peripheral area of the inter-die spaces 34a and 34b, can be heated or cooled efficiently.

(2) In order to prevent a non-uniform flow of the utility fluid at the center part of the dies 2 and 3, the second openings 50c are formed in the part where flow becomes non-uniform, so as to connect to the inter-die spaces 34a and 34b via the internal pipe 56, or to connect to the internal pipes 32a and 32b, or to connect to the utility pipes 15–18 via the utility valves, as shown in the die-expanded molded forming apparatus 1E shown in FIG. 8.

A non-uniform flow of the utility fluid is apt to occur when the space between the openings 30 and 50 for supplying or exhausting the utility fluid becomes 100 mm or more, so when a pair of the first openings 30a and 30b are disposed at the opposing positions of the peripheral area, sandwiching the cavity 4, and the space between the first openings 30a and 30b is 100 mm or more, as shown in FIG. 2, the second openings 50 may be formed at the intermediate position of the first openings 30a and 30b, as shown in FIG. 8. It is also preferable to form the second openings 50 such that the distance between the first opening 30 and the second opening 50 and the distance between the second openings 50 become 100 mm or less.

In accordance with this embodiment, where a pair of the first openings 30a and 30b are formed opposite each other, sandwiching the cavity 4, utility operation to supply such a utility fluid as steam from one of the first openings to the other first opening through the cavity, can be adopted, and particularly, operation for substituting air among the material beads 5 filled in the cavity 4 with steam and the operation for heating the material beads 5 quickly become possible.

Also the required number of second openings 50 are formed at a maximum of 100 mm spacing, which helps make the flow of the utility fluid smooth, preventing an uneven flow and uneven velocity of the utility fluid to be generated in the cavity 4. As a consequence, even if the flat portion at the center of the cavity has a shape with a high length/thickness ratio, 20 or more for example, density non-uniformity and foaming non-uniformity in the flat portion at the center can be controlled.

Now a method for molding a molded foam product using the molded foaming apparatus 1 shown in FIG. 1 will be explained.

The molding method is divided into three processes: a filling process for filling the material beads 5 in the cavity 4, a heating process for heating, expanding and fusing the material beads 5 filled in the cavity 4, and a cooling process for cooling the molded foam product.

At first the filling processing for filling the material beads 5 will be explained.

In this process, the core die 2 and the cavity die 3 are closed, at the same time the drain valves DV3 and DV4 are opened, air supplied into the cavity 4 is exhausted outside the cavity 4 through the first openings 30a and 30b while supplying the material beads 5 along with the flow of air from the filling unit 23 to the cavity 4, and the material beads 5, are filled into the cavity 4. Here, a crack, which is about 10% of the bottom wall thickness of the molded foam product, may be left open without completely closing the core die 2 and the cavity 3, so as to exhaust air in the cavity 4 through this crack.

Next the heating process for material beads 5 filled in the cavity 4 by steam will be explained.

At first the utility valves SV1 and SV2 are opened in a state where the drain valves DV1 and DV2 are open and steam is supplied to the chambers 13 and 14 to substitute the air in the chambers 13 and 14 with steam. This process may be carried out in the filling process.

Then the drain valves DV1 and DV2 are closed, and at the same time steam is supplied to the chambers 13 and 14 for a preset heating time while controlling the utility valves SV1 and SV2 so that the inside of the chambers 13 and 14 become the preset steam pressure, where the core die 2 and the cavity die 3 are heated, and the material beads 5 contacting the core die 2 and the cavity die 3 are expanded and fused so as to mold the surface part of the molded foam product.

On the other hand, the process for heating the material beads 5 filled in the cavity 4 is carried out in parallel, and this process is roughly divided into three.

In the first part of this process, the drain valve DV4 is opened and the drain valve DV3 is closed at the same time, the utility valves SV3, SV5 and SV6 are opened and the utility valve SV4 is closed at the same time, and steam is supplied to the cavity 4 so as to substitute the air among the material beads 5 with steam.

In the second part of this process, the drain valve DV4 is closed and the drain valve DV3 is opened at the same time, and the utility valve SV3 is closed and the utility valves SV4, SV5 and SV6 are opened at the same time, which is the opposite of the first part of the process, and steam is supplied to the cavity 4 so as to substitute the air among the material beads 5 with steam. The second part of this process, however, may be omitted.

In the third part of this process, the drain valves DV3 and DV4 are closed, and at the same time, steam is supplied to the cavity 4 only for the preset heating time while controlling the utility valves SV3–SV6 so that inside the cavity 4 becomes the preset steam pressure, and the material beads 5 are heated, expanded and fused to mold inside the molded foam product.

In this way, the surface portion of the molded foam product and the inside of the molded foam product can be independently heated by the steam to be supplied to the chambers 13 and 14 and the steam to be supplied to the cavity 4, therefore the surface property of the molded foam product and the internal fusion rate of the molded foam product can be independently adjusted.

In the next cooling process, the cooling water valves CV1 and CV2 are opened and cooling water is sprayed from the nozzle 24 into the core die 2 and the cavity die 3 so as to cool the molded foam product inside the cavity 4 via the core die 2 and the cavity die 3. Since air vents, such as core vents and core vent holes, are not formed in the core die 2 and the cavity die 3, the molded foam product is cooled without contacting the cooling water. Therefore moisture content of the molded foam product is only the steam which was liquefied and drained from the cavity 4, and the content can be $\frac{1}{5}$–$\frac{1}{10}$ that of the conventional molding method.

After cooling, the dies 2 and 3 are opened and the molded foam product is taken out from the dies using the ejector pin 24.

With this molding method, heating of the surface portion and heating inside the molded foam product can be carried out independently in the heating process, therefore in the case of a molded foam product for which mechanical strength is not a major requirement, for example, the cycle time of molding can be decreased by keeping the internal fusion rate of the molded foam product low while maintaining sufficient surface property, and as a result, both productivity and commercial value can be implemented.

Figure 9:
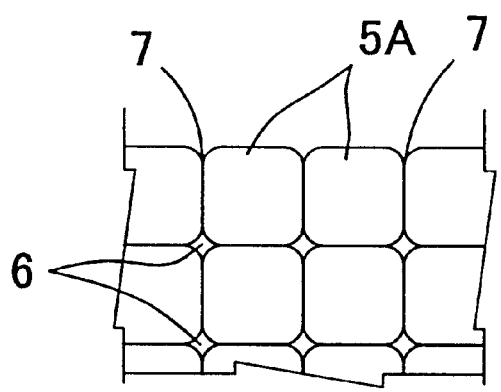
FIGS. 9(a) and 9(b) are drawings depicting the surface property and internal fusion rate of a molded foam product.
Figure 9:
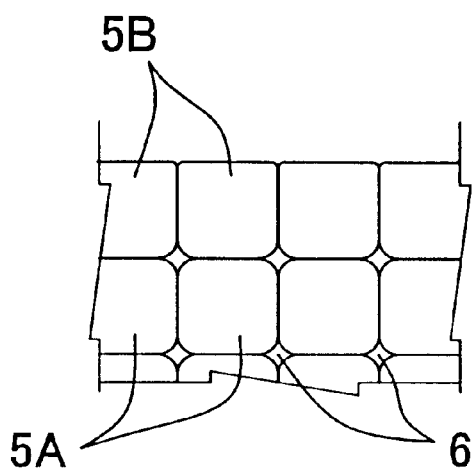
Figure 10:
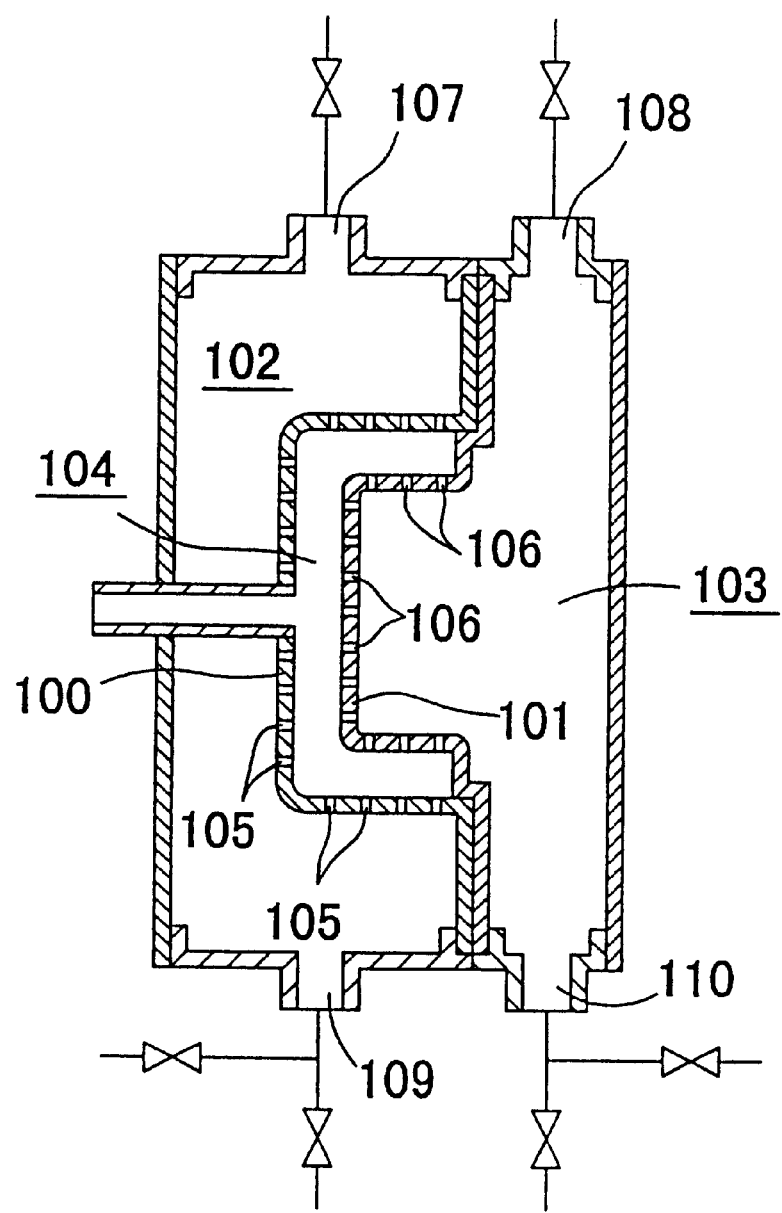
Figure 11:
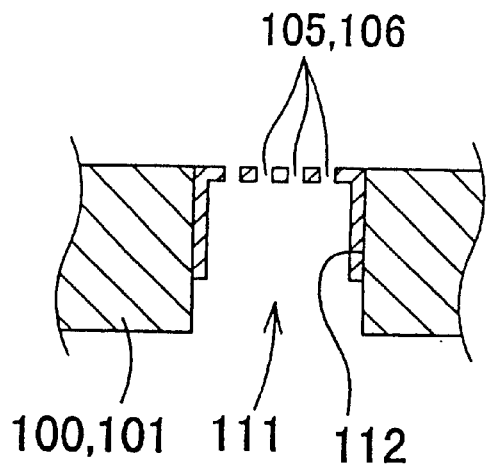
Figure 12:
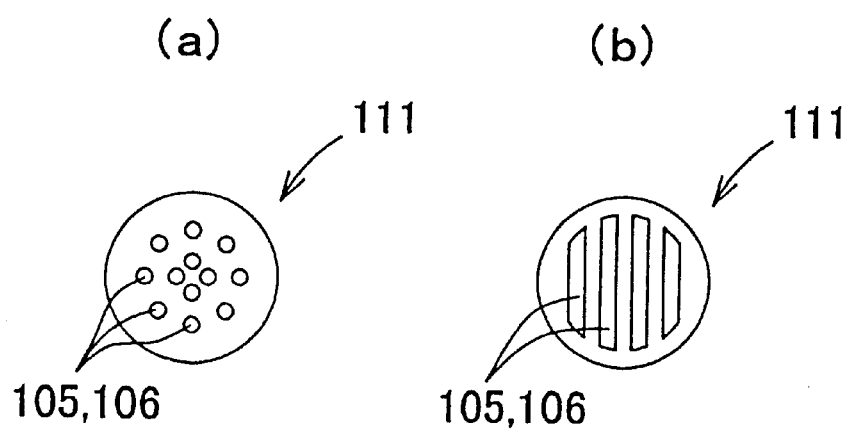
Figure 13:
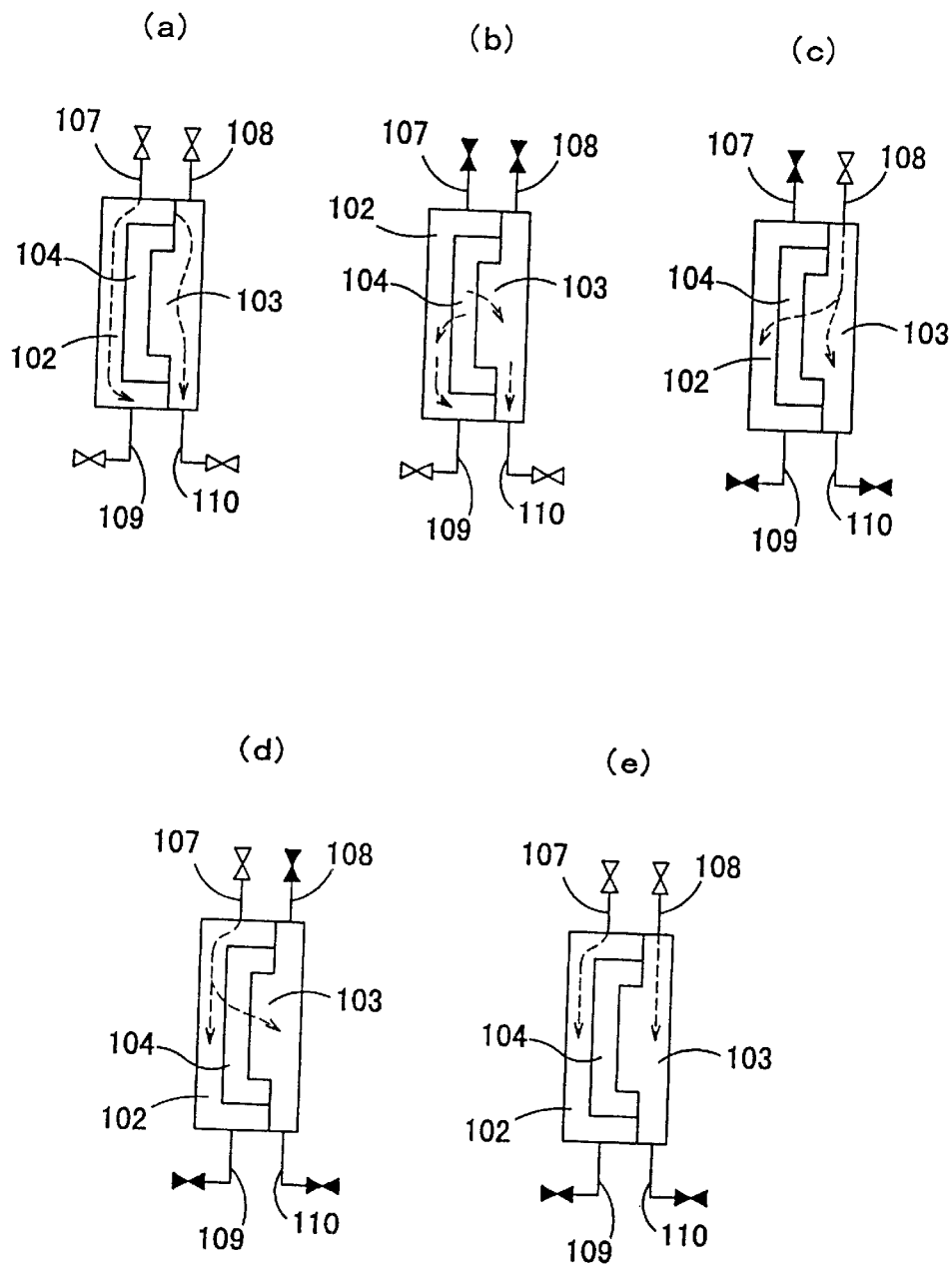

The molded foam product molded in this manner becomes a molded foam product with a beautiful surface without traces of core vents and core vent holes on the outer surface. In this molded foam product, the surface property can be set equivalent to an equal heating molded foam product manufactured based on conventional molding technology, whereas the internal fusion rate can be set lower or higher than that of the equal heating molded foam product with the above surface property. In other words, in the case of the conventional molding method, where the surface and the inside of the material beads are heated under the same conditions during the heating, expanding and fusing of the material beads, if the internal fusion rate of the molded foam product is set low, gaps 6 are formed at the boundaries of the beads 5A inside the molded foam product, and dents 7 are formed on the surface portion of the molded foam product, as shown in FIG. 9(a), whereas in the case of the molding method according to the present invention where the surface and the inside can be heated independently, only the internal fusion rate can be set low so that a beautiful molded foam product having a smooth surface with almost no dents 7 at the boundaries of the beads 5B on the surface of the molded foam product can be implemented, although gaps 6 are formed at the boundaries of the beads 5A inside the molded foam product, as shown in FIG. 9(b). Setting the internal fusion rate low can be suitably applied to molded foam products for which high surface property is demanded but mechanical strength is not a major requirement, such as a decorative form for the surface of concrete, or the cover of a container and heat insulating material, and setting the internal fusion rate high can be suitably applied to molded foam products for which surface property is not a major requirement but high mechanical strength is, or for molded foam products which can withstand repeated use, such as molded foam products for various components for automobiles and returnable containers. The present invention is more effective and useful for relatively large molded foam products with a complicated shape, rather than for small molded foam products with a simple shape, such as a container for instant noodles packaged in a cup. The present invention is particularly useful for a molded foam product having both thick and thin wall portions.

Now the evaluation tests for the above mentioned molding method and the quality evaluation test for the molded foam products manufactured thereby will be explained.

We molded material beads made of polypropylene under the heating conditions shown in Table 1, and measured the surface property and internal fusion rate of the molded foam products.

The surface property here was evaluated in five rankings according to the frequency of occurrence of dents 7 shown in FIG. 9(a), where the higher value indicates better surface property with less frequency of occurrence of dents 7. The fusion rate was based on the evaluation of beads status in the cross-section when the molded foam product is split, and more concretely, the ratio of broken beads determined by measurement, regarding a bead as not fused when the head itself is not broken but has a crack along its surface, and regarding a bead as fused when the bead itself is broken.

TABLE 1

| Heating condition kg/cm² | | Quality of molded foam product | | Molding | |
| --- | --- | --- | --- | --- | --- |
| Utility chambers 13, 14 | Cavity 4 | Surface property | Fusion rate % | cycle sec. | Case |
| 3.0 | 2.5 | 2 | 10 | 130 | A |
|  | 3.0 | 2 | 50 | 210 | B |
|  | 3.5 | 2 | 80 | 240 | C |
| 3.5 | 2.5 | 3 | 10 | 150 | D |
|  | 3.0 | 3 | 50 | 220 | E |
|  | 3.5 | 3 | 80 | 250 | F |
| 4.0 | 2.5 | 4 | 10 | 170 | G |
|  | 3.0 | 4 | 50 | 230 | H |
|  | 3.5 | 4 | 80 | 260 | I |

As the result shows, the surface property and the internal fusion rate of a molded foam product can be independently controlled by controlling the heating conditions of the chambers 13 and 14 and the heating conditions of the cavity 4 by steam from the first openings 30a and 30b. With the conventional molding method, only molded foam products with a quality corresponding to cases B and F in Table 1 can be manufactured, but with the present invention, molded foam products corresponding to cases A–I, can be manufactured with various combinations of surface properties and fusion rates, and flexibility of molding considerably expands.

For example, a molded foam product having good surface property with a low internal fusion rate, as shown in cases D and G, can be manufactured. In such molded foam products, mechanical strength is low since the internal fusion rate is low, but the expanding and fusing time and the cooling time can be decreased, and productivity can be increased while maintaining good surface property, therefore these molded foam products can be suitably used for molded foam products for which mechanical strength is not a major requirement, such as a decorative frame for the surface of concrete, or the cover of a container and heat insulating material. In order to manufacture such a molded foam product using the conventional molding method, 250 sec. or more of cycle time of molding is required as case F shows, if products with a surface property evaluated at 3 or higher are regarded as non-defective, but with the molding method of the present invention, such a product can be molded at 150 sec., 220 sec., 170 sec. and 230 sec. of cycle time respectively as cases D, E, G and H show, therefore productivity increases. Also the energy cost can be decreased since heating more than necessary is not carried out.

Also, molded foam products where the internal fusion rate is set high and the surface property is set somewhat low, as shown in case C, can be manufactured. In such molded foam products, mechanical strength is high since the internal fusion rate is high, but expanding and fusing time and cooling time can be decreased, steam pressure in the first openings 30a and 30b can be set low, and productivity is improved and energy is saved while sufficiently increasing the mechanical strength, therefore these molded foam products can be suitably used for molded foam products for which surface property is not a major requirement but mechanical strength is, such as molded foam products for various components for automobiles and returnable containers. In order to manufacture such a molded foam product using the conventional molding method, 250 sec. or more of cycle time of molding is required, as case F shows, if products with a fusion rate of 80 is regarded as non-defective, but with the molding method of the present invention, such a product can be molded with 240 sec. of cycle time, as case C shows, therefore productivity increases. Also energy cost can be decreased by lowering the steam pressure in the chambers 13 and 14, since steam pressure in the chambers 13 and 14 can be set a 3.5 kg/cm² for case F, whereas 3.0 kg/cm² for case C.

In accordance with the die-expanded molded foaming apparatus of synthetic resin according to the first aspect, traces of the first openings do not drop the beauty of appearance of the molded foam product since the first openings are formed only in a molding section of the dies which is to mold a non-outstanding portion of the molded foam product.

If chambers independent from the cavity is formed on the rear side of both of the dies, as described in the second aspect, and these chambers and the cavity are connected to the utility pipes as separate systems, it is possible to manufacture a molded foam product with a beautiful surface while decreasing the cycle time of molding, and to implement both productivity and commercial value. Also it is possible to prevent the moisture content of the molded foam product from increasing by contacting cooling water, and to obtain a clean molded form product without strictly controlling the cooling water to be in a clean state.

If the first openings are formed in a slit shape along the joint of the set of the dies as described in the third aspect, it is possible that the number of core vent attachment holes can be minimized or eliminated, which makes it possible to constitute the dies to be thin, decreasing manufacturing cost, improving control accuracy, and improving the productivity of the dies, and it is also possible to decrease or eliminate the maintenance operation required for the clogging of vent holes by scales, and to further improve the beauty in appearance of the molded foam product since the traces of the core vents and vent holes to be formed on the molded foam product are decreased or eliminated.

If the connecting passage connecting the first openings in a slit shape and the external utility pipes are formed from the cavity side to the outside along the joint of the dies, as described in the fourth aspect, or if the first openings are formed near the joint of the set of the dies, as described in the fifth aspect, either are preferable since steam can be supplied uniformly into the cavity.

If the utility passage is formed at a location which does not include the joint of the dies, and if the first openings formed near the joint are opened to the utility passages, as described in the sixth aspect, abrasion of the joint portion by steam can be prevented.

If the first openings are formed in a portion which is exposed to the cavity of an accessory part, such as a material beads filling unit and ejector pin, attached to at least one of the dies, as described in the seventh and eighth aspects, a drop in appearance of the molded foam product can be prevented since traces of the first openings are not outstanding.

If a plurality of the first openings are formed and divided into two groups, as described in the ninth aspect, steam can be evenly supplied to the cavity, and this is particularly preferable because operation to substitute the air among the material beds filled in the cavity with steam or operation of heating the material beads can be carried out quickly.

If the second openings opening to a portion of the cavity where the flow of the utility fluid becomes non-uniform, such as at an inner part of a concave area and at intermediate positions of the first openings, are formed in the dies, as described in the tenth-twelfth aspects, the quality of the molded foam product can be improved since the occurrence of density unevenness in filling the material beads, and heating and cooling non-uniformity can be controlled.

If the second openings and the first openings are connected to the utility pipes as different systems, as described in the thirteenth aspect, molded foam products with a higher quality can be manufactured because such control as first filling the material beads into a concave area where filling the material beads is difficult so as to control the filling density of the material beads to be even, can be possible.

If the replaceable opening forming element is disposed to the dies, as described in the fifteenth aspect, the abrasion of the dies by steam flowing through the first and second openings can be prevented.

In accordance with the method for die-expanded molded forming of synthetic resin according to the sixteenth aspect, wherein heating conditions for the cavity and for the set of the chambers are independently controlled, the fusion rate of the material beads can be adjusted independently from the surface property. This makes it possible to decrease the cycle time of molding while keeping the internal fusion rate of the molded foam product low, and to manufacture a beautiful molded foam product as well, consequently both productivity and commercial value can be implemented.

If a plurality of first openings are divided into two groups and four heating conditions, that is, the heating conditions for the cavity and the heating conditions for both of the chambers for these two groups are independently controlled, as described in the seventeenth aspect, the surface property of a surface at one side of the dies and the surface property of a surface at the other side of the dies of the molded foam product can be independently controlled, which expands flexibility in design for the surface property of the molded foam product.

If steam pressure and time are controlled as heating conditions, as described in the eighteenth aspect, it is unnecessary to construct a new control system.

What is claimed is:

1. A die-expanded molded foaming apparatus for synthetic resin, wherein a pair of dies cooperate to form a cavity in which the resin is processed for producing a molded foam product,
   chambers independent from the cavity are formed on a rear side of the dies that cooperate to mold the molded foam product,
   first openings opening to the cavity are formed in at least one portion of a slit shape along a joint formed between the cooperating dies, near the joint of the set of the dies, and a portion exposed to the cavity including an accessory part is attached to at least one of the dies,
   connecting passages are formed for connecting the first openings and external utility pipes, and
   the chambers and the cavity are connected to the utility pipes as separate systems.

2. The die-expanded molded foaming apparatus of synthetic resin according to claim 1, wherein the connecting passages for connecting said first openings in a slit shape and the external utility pipes extend from the cavity to the outside along the joint of the dies.

3. The die-expanded molded foaming apparatus of synthetic resin according to claim 1, wherein utility passages are formed at a location which does not include joint of the dies, and the first openings formed near the joint are opened to said utility passages.

4. The die-expanded molded foaming apparatus of synthetic resin according to claim 1, wherein said die-expanded molded foaming apparatus further comprises an accessory part and said accessory part is at least one of a material beads filling unit and an ejector pin.

5. The die-expanded molded foaming apparatus of synthetic resin according to claim 1, wherein a plurality of first openings are formed and are divided into two groups, so that the utility fluid can be supplied from the first openings of one group to the first openings of the other group via the cavity.

6. The die-expanded molded foaming apparatus of synthetic resin according to claim 1, wherein second openings opening to a portion where the flow of the utility fluid becomes non-uniform in the cavity are formed in said dies, and the connecting passages for connecting said second openings and the external utility pipes are disposed.

7. The die-expanded molded foaming apparatus of synthetic resin according to claim 6, wherein said second openings are formed in the inner part of a concave area of the dies.

8. The die-expanded molded foaming apparatus of synthetic resin according to claim 6, wherein a pair of said first openings in a slit shape are formed, and when the space between said first openings is 100 mm or more, said second openings are formed on a surface of the die at the intermediate position of the first openings.

9. The die-expanded molded foaming apparatus of synthetic resin according to any one of claims 6–8, wherein said second openings and first openings are connected pipes as different systems.

10. The die-expanded molded foaming apparatus of synthetic resin according to claim 1, wherein the width of the opening of said first openings and the second openings is set to the outer diameter or less of a material bead to be filled.

11. The die-expanded molded foaming apparatus of synthetic resin according to claim 1, wherein the first openings and the second openings are formed by disposing a replaceable opening forming element to said dies.

12. A method for die-expanded molded foaming of synthetic resin, wherein using the die-expanded molded foaming apparatus of synthetic resin according to any one of claims 1–11, where the chambers independent from the cavity are formed on the rear side of the set of the dies respectively so as to supply steam as the utility fluid independently to the cavity and both chambers, the heating conditions for both of the chambers and the heating conditions for the cavity are controlled in a state where material beads made of thermoplastic synthetic resin are filled in the cavity, and the material beads filled in the cavity are heated, expanded and fused while controlling an internal fusion rate at will with maintaining the surface property of the molded foamed product.

13. The method for die-expanded molded foaming of synthetic resin according to claim 12, wherein a plurality of the first openings are divided into two groups, and the internal fusion rate is controlled at will with maintaining the surface property of the molded foam product, while independently controlling the four heating conditions, that is, the heating conditions for the cavity and the heating conditions for both of the chambers for these two groups.

14. The method for die-expanded molded foaming method of synthetic resin according to claim 12 or claim 13, wherein the steam pressure and time are controlled as the heating conditions.

* * * * *